(12) United States Patent
Shah

(10) Patent No.: US 9,330,010 B1
(45) Date of Patent: May 3, 2016

(54) METHODS AND SYSTEMS FOR IMPROVED DATA CACHING IN A VIRTUALIZED ENVIRONMENT

(71) Applicant: QLOGIC, Corporation, Aliso Viejo, CA (US)

(72) Inventor: Bhavik Shah, Ahmedabad (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 126 days.

(21) Appl. No.: 14/470,337

(22) Filed: Aug. 27, 2014

(51) Int. Cl.
*G06F 12/00* (2006.01)
*G06F 12/08* (2016.01)
*G06F 3/06* (2006.01)

(52) U.S. Cl.
CPC ............ *G06F 12/0873* (2013.01); *G06F 3/061* (2013.01); *G06F 3/067* (2013.01); *G06F 3/0659* (2013.01); *G06F 3/0688* (2013.01); *G06F 2212/608* (2013.01); *G06F 2212/7208* (2013.01)

(58) Field of Classification Search
CPC ..... G06F 12/0873; G06F 12/10; G06F 3/061; G06F 3/0659; G06F 3/067; G06F 3/0688; G06F 2212/608; G06F 2212/7208
See application file for complete search history.

(56) References Cited

U.S. PATENT DOCUMENTS

2013/0198459 A1* 8/2013 Joshi .................... G06F 12/084
711/130

* cited by examiner

*Primary Examiner* — Shawn X Gu
(74) *Attorney, Agent, or Firm* — Klein, O'Neill & Singh, LLP

(57) ABSTRACT

Systems and methods for data storage and caching in a system including virtual machines is disclosed. In an embodiment, a machine implemented method includes mapping a plurality of virtual hard drives to a logical unit number (LUN) of a storage system, each virtual hard drive including a logical block address (LBA) range of the storage system LUN; storing the mapping in a caching module data structure; determining that one of the virtual hard drives should be cached; and updating the caching module data structure to indicate that the LBA range associated with the one of the virtual hard drives should be cached.

21 Claims, 8 Drawing Sheets

METHODS AND SYSTEMS FOR IMPROVED DATA CACHING IN A VIRTUALIZED ENVIRONMENT

TECHNICAL FIELD

The present disclosure relates to data storage in a virtualized computer environment and more particularly to caching data in the virtualized environment.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data. For example, options include direct-attached storage (DAS), network-attached storage (NAS), and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System), and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

In order to effectively use network storage solutions, as described, computer systems often utilize caching mechanisms, by placing more often used or more likely to be used data into high speed and/or local memory solutions (such as flash memory, for example). This process becomes much more complex in a virtualized environment. In a virtualized environment, a hypervisor or virtual machine monitor (VMM) is a piece of computer software, firmware or hardware that manages virtual machines. Multiple virtual machines (VMs) can be presented to one or more users while sharing the same physical resources. A computer on which a hypervisor is running one or more virtual machines is defined as a host machine. Each virtual machine is called a guest machine. The hypervisor presents the guest operating systems with a virtual operating platform and manages the execution of the guest operating systems. Multiple instances of a variety of operating systems may share the virtualized hardware resources.

In a virtualized environment, a hypervisor is presented with a set of logical unit identifiers (or LUNs) to identifier storage resources, such as on a SAN. The hypervisor must then present those LUNs to the virtual machines, typically by splitting them into smaller LUNs and presenting different pieces to different virtual machines. With the variety of operating systems and applications running at different virtual machines, input/output (I/O) operations from the hypervisor become highly randomized, which is sometimes referred to as the "I/O blender effect." Determining whether an entire SAN LUN should be cached or not can be difficult, and even if the decision is made, large chunks of that cache may end up being wasteful, as only portions of the hypervisor's LUNs may benefit from caching operations. Continuous efforts are being made to provide improved caching mechanisms, particularly in virtualized environments.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
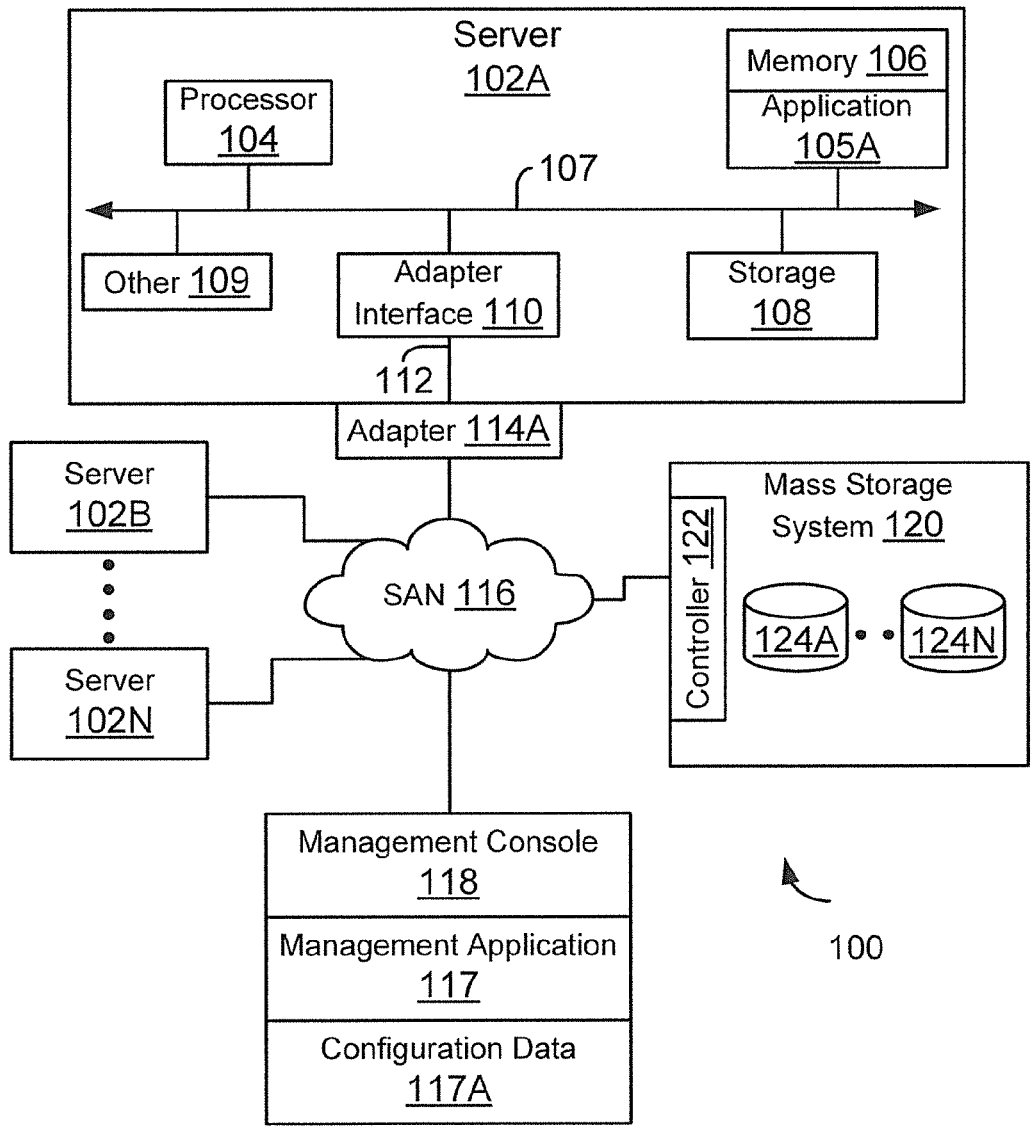
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a SAN-based storage device and with another adapter operating within a cluster. The adapter includes a processor executing instructions for managing a local storage device that is configured to operate as a caching device for a computing device. The adapter operates as a host bus adapter and a storage controller for managing storage space at the local storage device and the SAN-based storage device.

System 100:

FIG. 1A is a block diagram of a system 100 configured for use with the present embodiments. System 100 may include a plurality of computing systems 102A-102N (which may also be referred to as server(s) 102 or host system(s) 102), each coupled to an adapter, as illustrated herein by server 102A and adapter 114A (also referred to as an ISA 114A) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108, which may be for example a hard disk (HDD), a solid-state drive (SSD), a hybrid drive (sometimes referred to as SSHD), a CD, DVD, or Blu-Ray drive, a non-volatile memory device (flash or memory stick) or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a SSD. SSDs are becoming popular for servers that may need to store large amounts of data with relatively quick access. ISA 114A described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In an embodiment, processor 104 may execute an application 105A for performing certain functions. For example, application 105A may be a database application, a virtual machine executed in a virtual environment (provided by VMware Corporation, Microsoft Corporation or any other entity), an electronic email application (for example, Microsoft Exchange), or any other application type. Application 105A may issue read and write requests that are processed by ISA 114A, as described below in more detail. Application 105A may also be referred to as a "client."

The computing system 102A also includes other devices and interfaces 109, which may include a display device interface, a keyboard interface, a pointing device interface and others. The details of these components are not germane to the inventive embodiments.

ISA 114A may be configured to handle both network and storage traffic while interfacing with other elements. In one embodiment, as described below in detail, ISA 114A may be configured to provide the functionality of a host bus adapter (HBA) by providing connectivity to SAN-based storage arrays, as well as, present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (GB). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (or FC) is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114A can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114A may operate as an initiator as well as a target for responding to input/output (I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114A may be referred to as "cache" LUN. A cache LUN may be used to cache data stored at a SAN LUN or another data LUN. The cache LUN is managed by ISA 114A and may not be visible to application 105A.

Referring back to FIG. 1A, computing system 102 uses an adapter interface 110 to communicate with ISA 114A via a link 112. In one embodiment, link 112 may be a PCI-Express link or any other interconnect type. The adaptive embodiments disclosed herein are not limited to any particular link type.

ISA 114A may communicate and interface with a mass storage system 120 via a SAN 116 that may include one or more switch(es) (which also may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114A and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other Servers 102B-102N.

In another embodiment, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
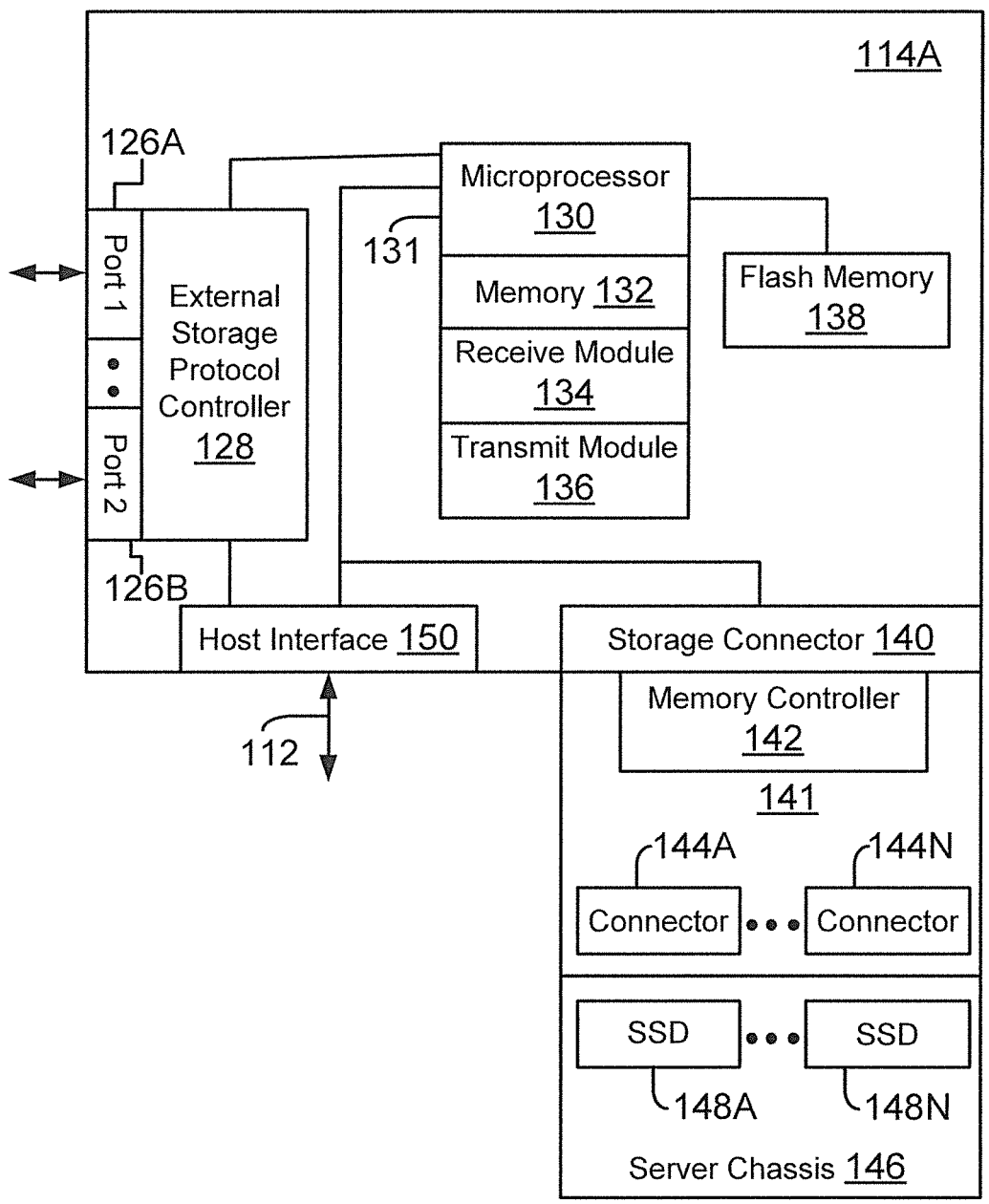
FIG. 1B is a functional block diagram of an exemplary intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) used for interfacing with Fibre Channel based storage devices via ports 126A/126B. In such an embodiment, ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC4. FC0 is defined by the Fibre Channel specification as the physical layer, which includes cables (fiber optics, twisted-pair), connectors and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. The FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A further includes a system-on-chip (SOC) 131 that includes a processor 130 having access to an adapter memory (which may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in, for example, SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors. In other embodiments, any or all of the SSDs 148 may be replaced with other storage options as described herein with reference to storage 108.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

In another embodiment, ISA 114A is configured such that a daughter card has the SSDs 148A-148N on the card itself, rather than on the server chassis 146. In another embodiment, ISA 114A is configured such that the memory controller 142 is on the same card as the other components of ISA 114A. The SSDs 148A-148N are also on the same card connected via one or more storage connectors.

Figure 1C:
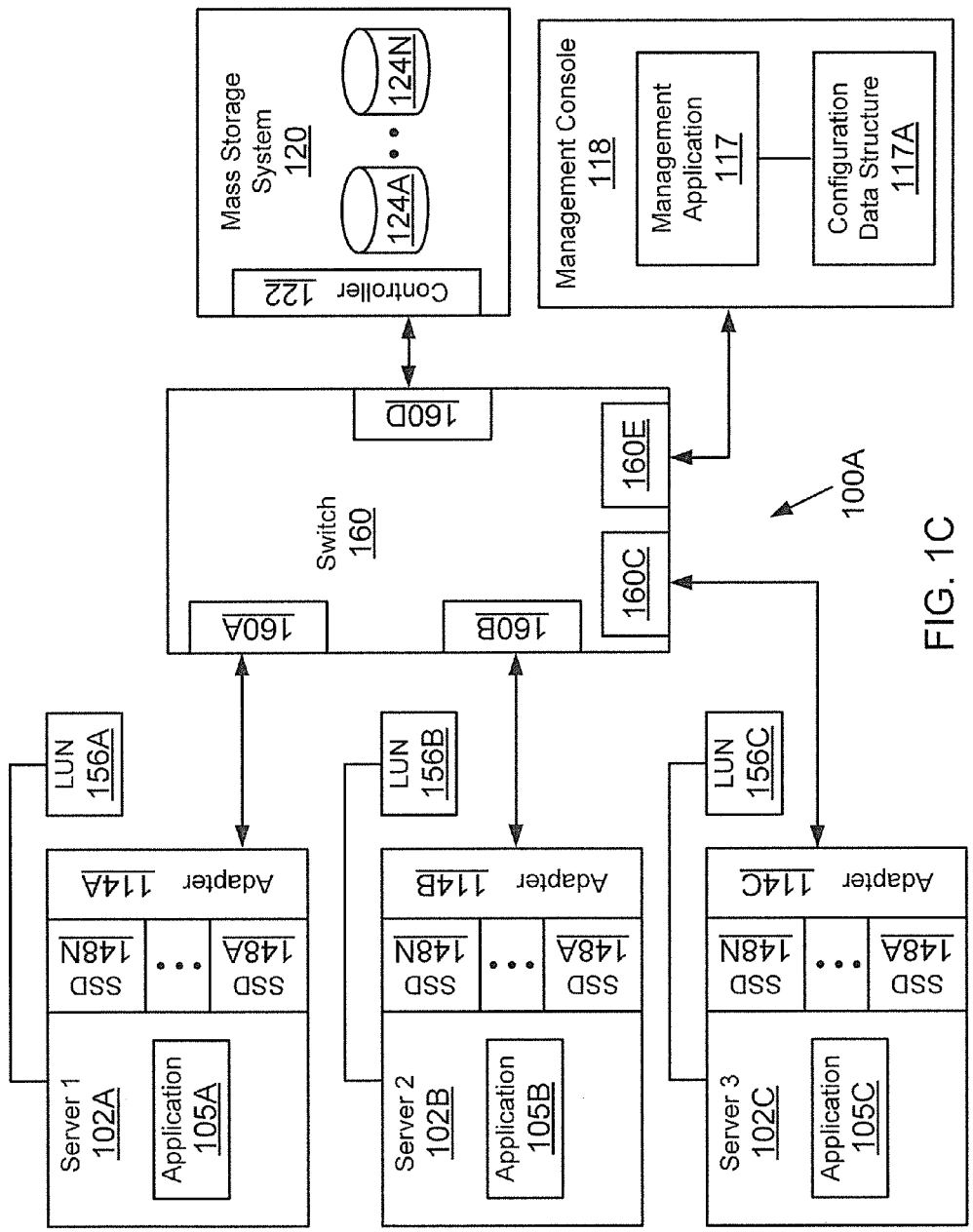
FIG. 1C shows an example of a configuration for using the ISAs, according to one embodiment.

FIG. 1C shows a system 100A where each ISA 114A-114C in servers' 102A-102C are coupled to a fabric switch 160, according to one embodiment. ISA 114B and 114C are similar to ISA 114A described above. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105B executed by server 102B, and application 105C executed by server 102C for storing information. The LUNs may be based on storage located at SAN-based storage 120 or at a local SSD 148A-148N. In one embodiment, one or more SAN LUNs are associated with an independent Data LUN. The SAN LUNs are used to read-write information. The information that is written to the SAN LUNs is also replicated at the Data LUN and then used by an application for "off-host" processing, as described below in detail.

The LUNs 156A-156C may also be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via switch 160. In this example, a DAS-based SSD becomes accessible as SAN storage, while the DAS-based storage is still managed by an application 105A (for example, a database application).

In one embodiment, ISAs 114A-114C operate within a cluster. The cluster is configured using management application 117. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105B. In this configuration, ISA 114B becomes the client ISA or the client adapter.

Figure 1D:
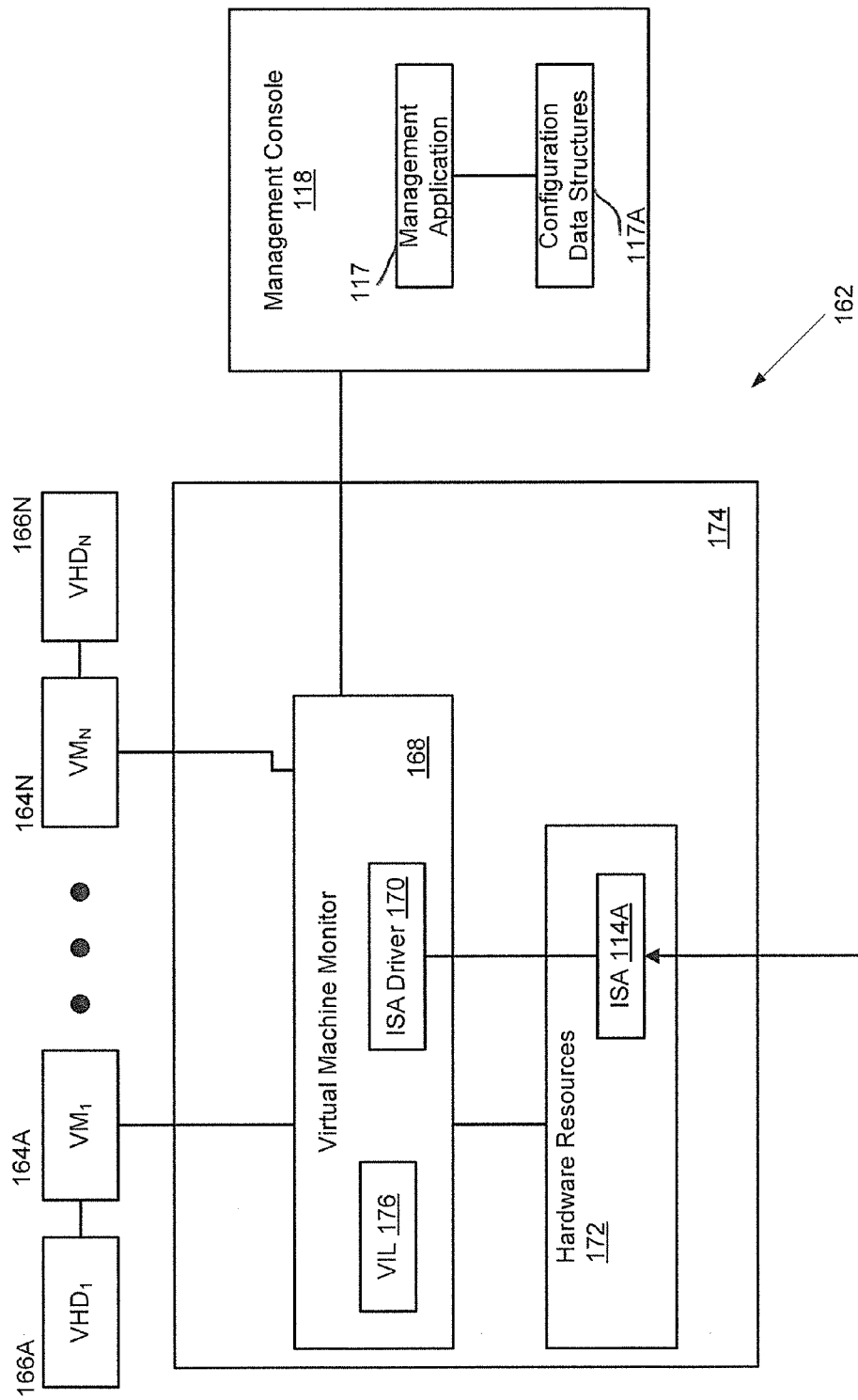
FIG. 1D is a block diagram of a hypervisor server, according to one embodiment.

FIG. 1D illustrates a block diagram of a hypervisor server 174 in a virtualized system 162. System 162 includes a virtual machine environment 174 where a physical resource is time-shared among a plurality of independently operating processor executable virtual machines ($VM_1 \ldots VM_N$), shown as 164A-164N. Each VM 164A-164N includes access to virtual storage space that may be referred to as one or more virtual hard drive 166A-166N (or VHDs). Although shown here, the VMs and VHDs need not be in a one-to-one ratio; for example, one VM may have several associated VHDs. Each VM may function as a self-contained platform, running its own operating system (OS) and computer executable, application software. Each VM may run its own OS, such as, for example, Microsoft® Windows, Linux, UNIX, iOS, or the like. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources 172 on a physical computing system (may also be referred to as a host platform) which may be referred to herein as "host hardware resources." The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform. In an embodiment, hardware resources 172 include an ISA 114A for communication with, for example, a SAN as described above.

In one aspect, hypervisor server 174 includes a virtual machine monitor (VMM) 168, for example, a processor executed Hyper-V layer provided by Microsoft Corporation of Redmond, Wash., a hypervisor layer provided by VMWare Inc. (without derogation of any trademark rights), or any other type. VMM 168 presents and manages the plurality of guest OSes executed by the virtualized system 162. The VMM 168 may include or interface with a virtualization interface layer (VIL) 176 that provides one or more virtualizations of the hardware resources 172 to each VM 164A-164N. In an embodiment, the virtualized hardware resources include a virtual storage resource (or virtual hard drive or "VHD"), and VMM 168 presents each VM 164A-164N with an associated VHD 166A-166N. VMM 168 may additionally incorporate an ISA driver 170 to implement communication with the ISA 114A.

Furthermore, according to an embodiment, VMM 168 may communicate with a management console 118 including management application 117 having one or more configuration data structures 117A. Management console 118 may be used to configure VMs, virtual storage, and the like.

In an aspect, VMM 168 may be executed by an independent stand-alone computing system, such as hypervisor server 174 (or VMM server) and VMs 164A-164N are presented at one or more computing systems.

It is noteworthy that in some instances, a virtualization environment may include one or more hypervisors, used independently or through a hypervisor aggregator. The virtualization environment described above with respect to FIG. 1D may be customized to implement the various aspects of the present disclosure. The various aspects of the present disclosure are not limited to any specific virtualization environment. Furthermore, VMM 168 may execute other modules, for example, a storage driver, network interface and others, the details of which are not germane to the aspects described herein and hence have not been described in detail.

Figure 1E:
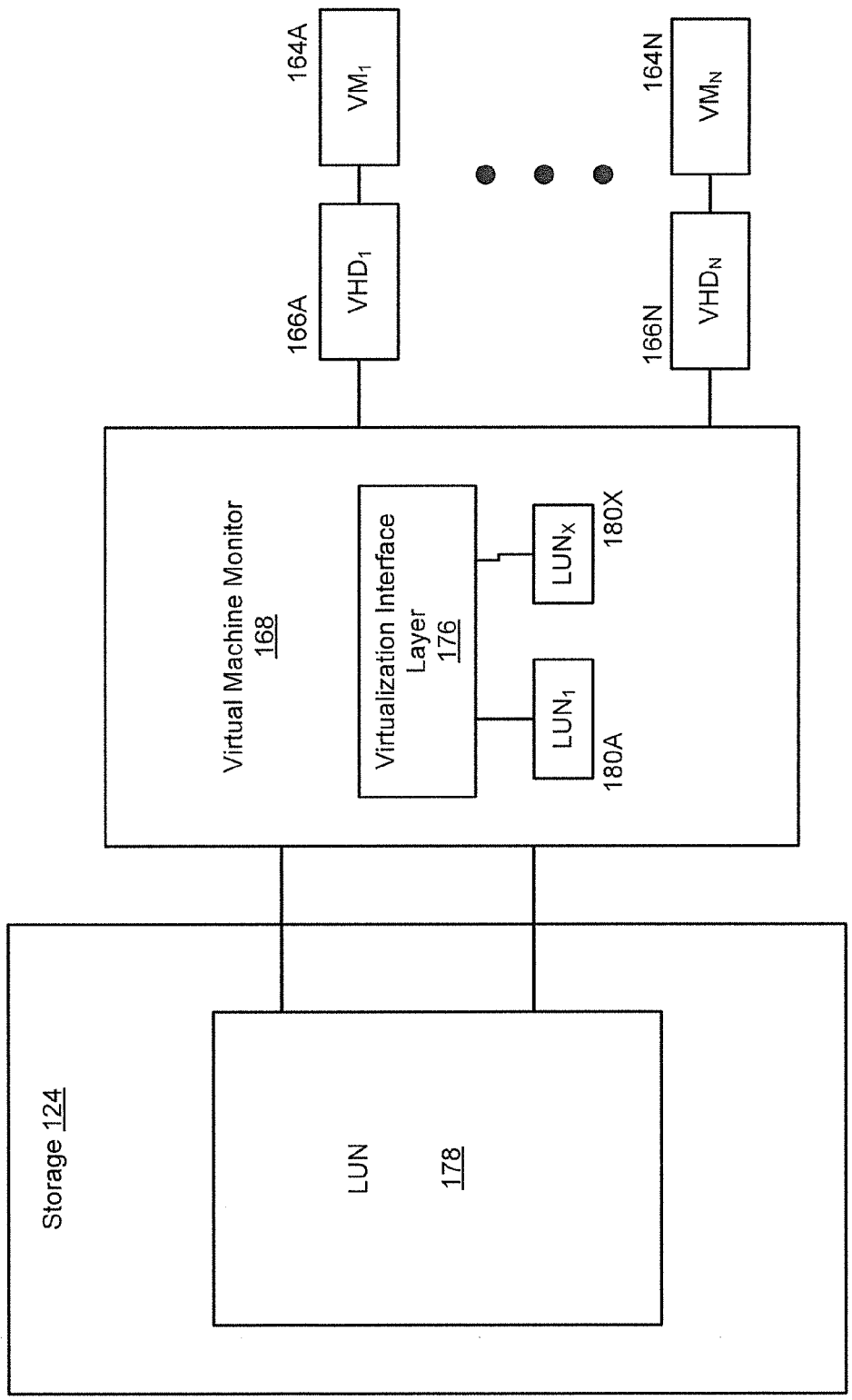
FIG. 1E is a block diagram of a virtualization of a data storage LUN, according to one embodiment.

FIG. 1E illustrates storage management in a virtual environment, and more specifically to the virtualization of a data storage LUN, as presented to various aspects of a virtual storage system, according to an embodiment. In an embodiment, a storage resource 124 presents a LUN 178 (or multiple LUNs) to the VMM 168. This LUN 178 may also be referred to as a "big LUN" herein for reasons that will become apparent. For example, LUN 178 may comprise a SAN LUN. In an embodiment, the storage resource 124 may include a SAN, NAS, and/or DAS, for example. VIL 176 can be used to virtualize the resources available to the VMs 164A-164N, in an embodiment. Big LUN 178 may be quite large, and virtualization interface layer 176 can be used to virtualize the storage resources and break up big LUN 178 into smaller LUNs 180A-180X for presentation to various VMs 164A-164N. These "small" LUNs may make up some or all of the associated VHDs 166A-166N.

Figure 1F:
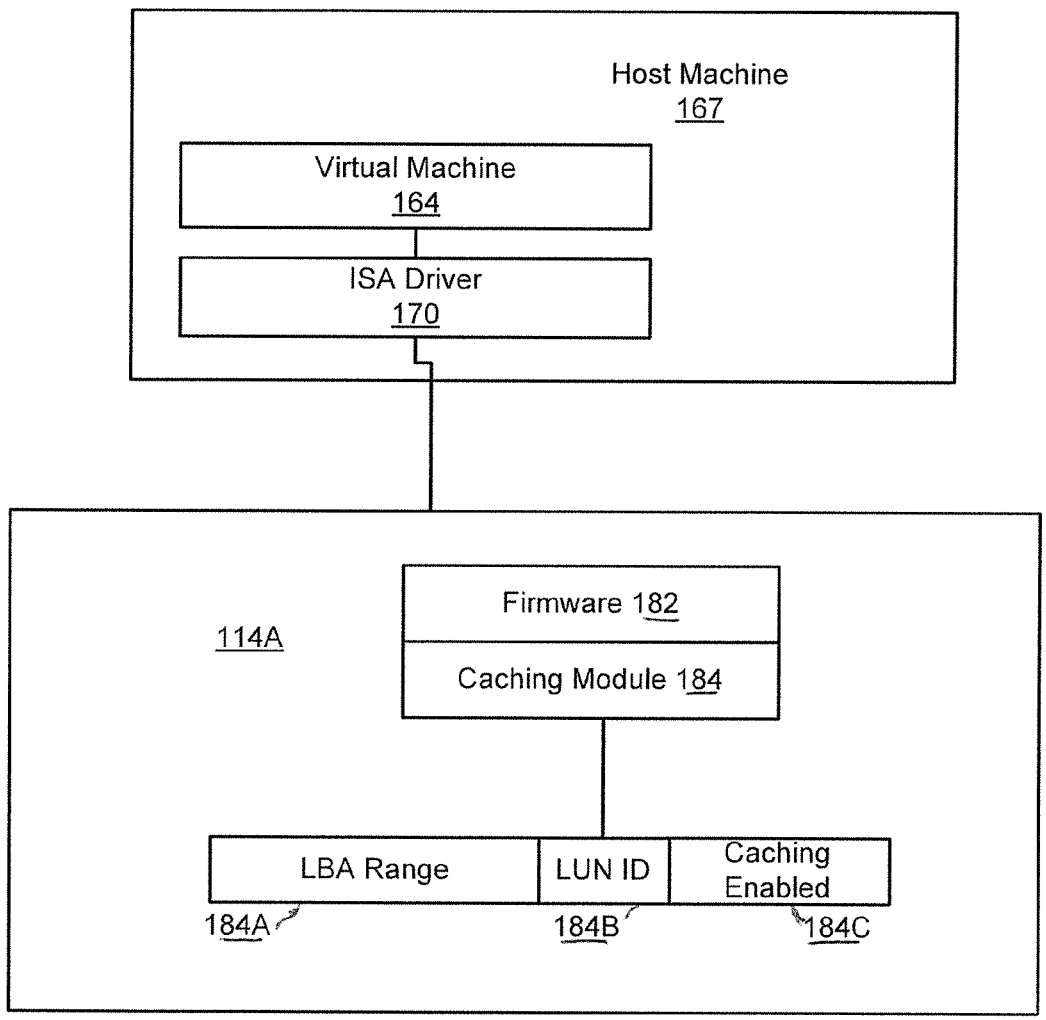
FIG. 1F is a block diagram of a host machine and an ISA adapted for caching in a virtual environment, according to one embodiment.

FIG. 1F illustrates a software architecture, according to an aspect of the current disclosure. VM 164 operates on a host machine 167 and interacts with ISA driver 170, which communicates with ISA 114A. As will be understood by those of skill in the art and from the disclosure herein, the host machine 167 can include any general purpose computing system, such as described with respect to computing system 102A above; special purpose computing hardware and software may also be used to host VMs. ISA 114A includes firmware 182 for executing various ISA functions. In this case, firmware 182 includes a caching module 184 which includes storing a caching data structure that tracks a logical block addressing (LBA) range 184A, an associated LUN ID 184B, and an indication of whether caching is enabled for this LBA range 184C. LBA 184A, in an aspect, conforms to a common scheme used for specifying the location of blocks of data stored on computer storage devices. An LBA is a particularly simple linear addressing scheme; blocks are located by an integer index, with the first block being LBA 0, the second LBA 1, and so on. In an embodiment LUN ID 184B refers to the big LUN 178, as provided by storage 124. With this caching data structure, the firmware 182 and caching module 184 can look up various LBA ranges associated with I/O requests to determine whether or not they should be cached. This allows the ISA 114A to cache portions of a LUN, as opposed to caching or not caching an entire LUN. Various criteria may be used to determine whether caching is enabled for a particular LBA range. In an embodiment, a user, such as a system administrator, can make the determination. In another embodiment, caching module 184 can automatically make the determination based on factors such as LBA usage statistics, data regarding an associated VM 164, the type of data stored in an LBA range, combinations of the same, and/or the like. In yet another embodiment, a caching enabled determination can be made by a combination of system factors and manual input from a user.

Figure 2:
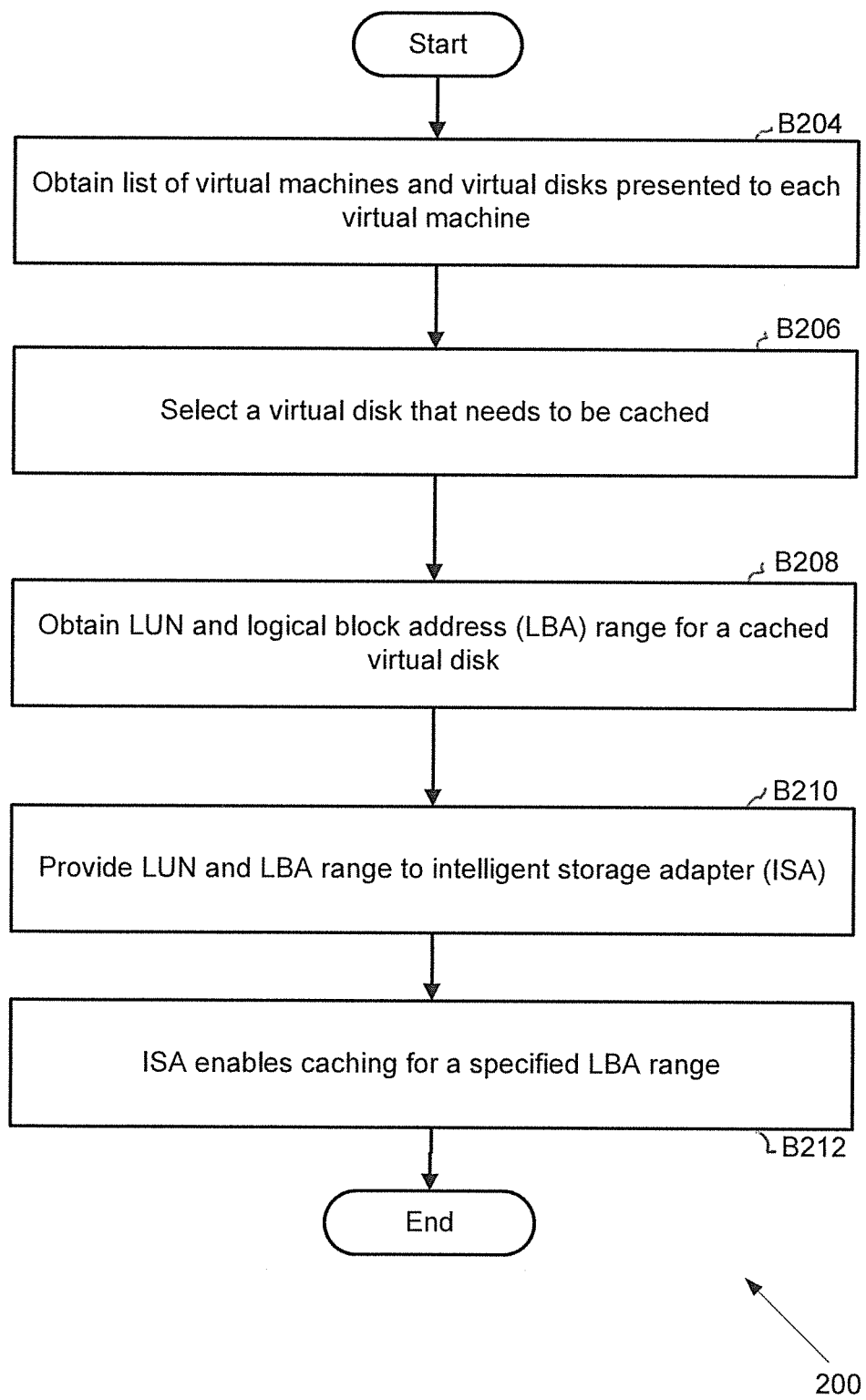
FIG. 2 is a process flow diagram of a configuration process for caching in a virtualized environment, according to one embodiment.

FIG. 2 represents an embodiment of a process 200 for configuring a caching system in accordance with the disclosure herein. Starting in block B204, a list of virtual machines (such as VMs 164A-164N, in FIG. 1D) and virtual disks (VHDs 166A-166N) presented to each virtual machine is created. In an embodiment, this may be accomplished by the VMM 168 and/or Management Application 117, for example. In block B206, a virtual disk that needs to be cached is selected. As stated above, this selection may be based on user input, such as through a management application 117, in an embodiment. In another embodiment, the selection process may be based on virtual disk usage statistics or other data from automated monitoring of the system, for example.

The LUN ID and LBA range of the virtual disk are determined in block B208 and provided to an ISA (114A) in block B210. In an embodiment, the LUN ID and LBA range may be determined through the virtualization interface layer 176 of a virtual machine monitor 168 and may refer to the "big" LUN 178 provided by storage 124 (see FIG. 1E). In block B212, the ISA updates the caching module 184 with the LBA range (184A) and LUN ID (184B) and enables caching for the selected range (184C). In an embodiment, this allows a reduction in the amount of cache storage rather than caching the entire "big LUN," thereby improving performance at a more optimum cost.

Figure 3:
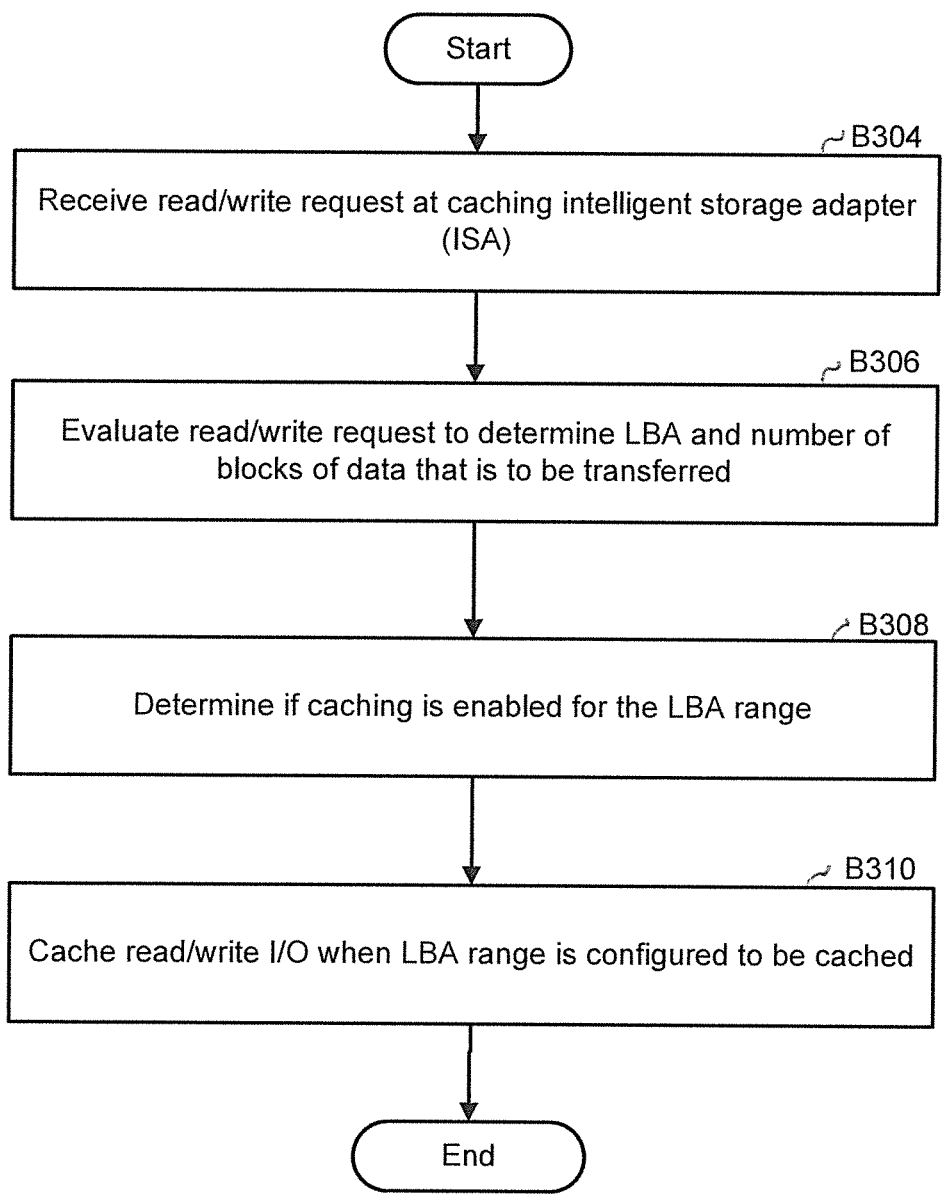
FIG. 3 is a process flow diagram of processing I/O requests in a virtualized environment, according to one embodiment.

FIG. 3 represents an embodiment of a process for handling caching with a read/write request from a VM. The process starts with a VM initialized and running on a host system. At block B304, the ISA receives a read/write I/O request. At block B306, the ISA evaluates the read/write I/O request to determine the LBA and number of data blocks that are to be transferred. At block B308, the ISA determines if caching is enabled for the LBA range, utilizing the caching module 184 and its data structure, described above with respect to FIG. 1F. If the read/write I/O request is for a LUN ID and the number of data blocks requested to be read or written are within an LBA range where caching is enabled, then the ISA can write to the cache in the case of a write request, and forward the I/O to the main storage LUN. In an embodiment, forwarding the I/O to the main storage LUN may occur immediately (sometimes referred to as "write through" caching); in another embodiment, the I/O may be forwarded to the main storage LUN at a later time, such as when system resources are idle ("write back" caching). In the case of a read request, the ISA may be able to read the data from the cache and simply respond without polling the main storage LUN. In an embodiment, the ISA can also determine if a read/write request extends across different LBA ranges where some is cached and another part is not. In such a case, the ISA may break up the I/O request and process part of it for caching and part of it for non-cache handling. In another embodiment, the ISA may elect to process the entire I/O request as non-caching. Through these exemplary processes and the teachings of the disclosure herein, the I/O blender effect may be reduced and caching resources may be more optimally utilized.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
mapping a plurality of virtual hard drives to a logical unit number (LUN) of a storage system, each virtual hard drive including a logical block address (LBA) range of the storage system LUN;
storing the mapping in a caching module data structure;
determining that one of the virtual hard drives should be cached; and
updating the caching module data structure to indicate that the LBA range associated with the one of the virtual hard drives should be cached.

2. The machine implemented method of claim 1 further comprising:
receiving an input/output (I/O) command from a virtual machine, the I/O command relating to an I/O LUN for a command data length; and
when the caching data structure indicates that caching is allowed for a LBA range referenced by the I/O LUN and command data length, processing the I/O command for a cache LUN.

3. The machine implemented method of claim 2 further comprising: forwarding the I/O command to the storage system.

4. The machine implemented method of claim 3, wherein forwarding the I/O command is a lower priority when the I/O command has been processed for the cache LUN than when it has not.

5. The machine implemented method of claim 1, wherein determining that one of the virtual hard drives should be cached includes receiving input from a system manager.

6. The machine implemented method of claim 1, wherein determining that one of the virtual hard drives should be cached includes tracking I/O statistics for the virtual hard drives.

7. A machine implemented method comprising:
selecting a virtual machine for which to provide caching;
obtaining parameters of a virtual disk associated with the virtual machine, the parameters including a storage LUN identity and a LBA range;
updating a caching module data structure with the storage LUN identity and the LBA range to allow caching;
receiving an I/O command from a virtual machine, the I/O command for reading from or writing to an I/O LUN at an LBA start location for a data length;
checking the I/O LUN and the data length against the caching module data structure to determine if the I/O command relates to an LBA range that allows caching; and
processing the I/O command for a cache LUN, when the determination is that the LBA range allows caching.

8. The machine implemented method of claim 7 wherein the caching module data structure comprises a plurality of LUN identifiers (IDs) corresponding to LUNs available to the virtual machine, each LUN ID having a plurality of associated LBA ranges, and each associated LBA range having an associated cache approval indicator.

9. The machine implemented method of claim 8 wherein checking the I/O LUN and the data length against the caching module data structure to determine if the I/O command relates to an LBA range that allows caching, comprises:
finding the I/O LUN in the plurality of LUN IDs;
finding a matching LBA range from the plurality of associated LBA ranges that corresponds to the LBA start location and the data length; and
checking the associated cache approval indicator for the matching LBA range.

10. A non-transitory, machine readable storage medium storing executable instructions, which when executed by a machine, causes the machine to perform a method, the method comprising:
mapping a plurality of virtual hard drives to a logical unit number (LUN) of a storage system, each virtual hard drive including a logical block address (LBA) range of the storage system LUN;
storing the mapping in a caching module data structure;
determining that one of the virtual hard drives should be cached; and updating the caching module data structure to indicate that the LBA range associated with the one of the virtual hard drives should be cached.

11. The storage medium of claim 10, the method further comprising:
   receiving an input/output (I/O) command from a virtual machine, the I/O command relating to an I/O LUN for a command data length; and
   when the caching data structure indicates that caching is allowed for a LBA range referenced by the I/O LUN and command data length, processing the I/O command for a cache LUN.

12. The storage medium of claim 11, the method further comprising: forwarding the I/O command to the storage system.

13. The storage medium of claim 12, wherein forwarding the I/O command is a lower priority when the I/O command has been processed for the cache LUN than when it has not.

14. The storage medium of claim 10, wherein determining that one of the virtual hard drives should be cached includes receiving input from a system manager.

15. The storage medium of claim 10, wherein determining that one of the virtual hard drives should be cached includes tracking I/O statistics for the virtual hard drives.

16. A system comprising:
   a processor executing instructions out of a memory for:
      mapping a plurality of virtual hard drives to a logical unit number (LUN) of a storage system, each virtual hard drive including a logical block address (LBA) range of the storage system LUN;
      storing the mapping in a caching module data structure;
      determining that one of the virtual hard drives should be cached; and
      updating the caching module data structure to indicate that the LBA range associated with the one of the virtual hard drives should be cached.

17. The system of claim 16 further including instructions for:
   receiving an input/output (I/O) command from a virtual machine, the I/O command relating to an I/O LUN for a command data length; and
   when the caching data structure indicates that caching is allowed for the LBA range referenced by the I/O LUN and command data length, processing the I/O command for a cache LUN.

18. The system of claim 17 further including instructions for: forwarding the I/O command to the storage system.

19. The system of claim 18, wherein forwarding the I/O command is a lower priority when the I/O command has been processed for the cache LUN than when it has not.

20. The system of claim 16, wherein determining that one of the virtual hard drives should be cached includes receiving input from a system manager.

21. The system of claim 16, wherein determining that one of the virtual hard drives should be cached includes tracking I/O statistics for the virtual hard drives.

* * * * *